April 16, 1940. H. R. SCHUPPNER 2,197,160
COMPARTMENT COOP
Filed Oct. 12, 1933 5 Sheets-Sheet 3
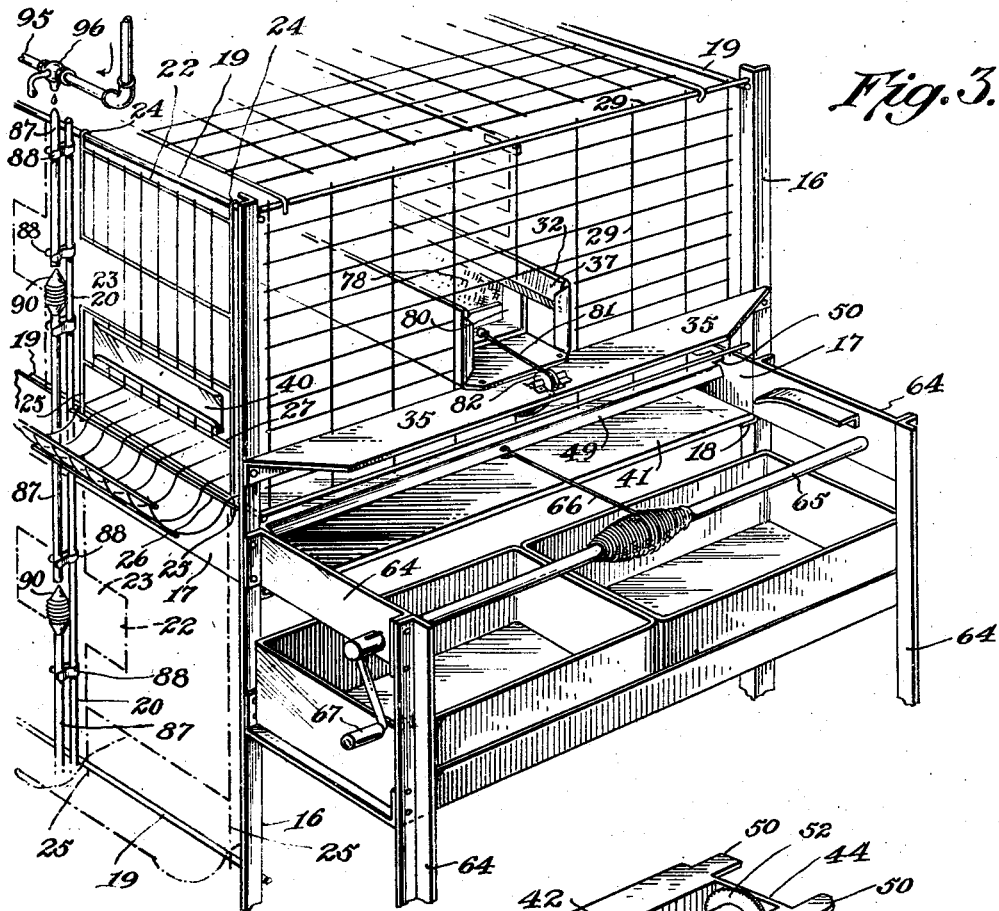
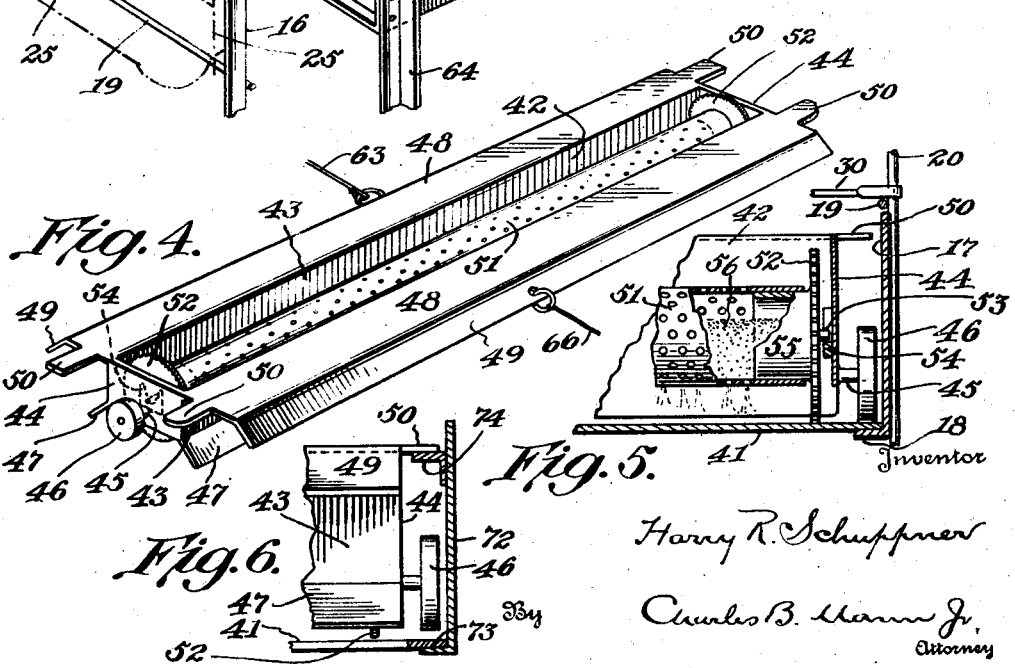

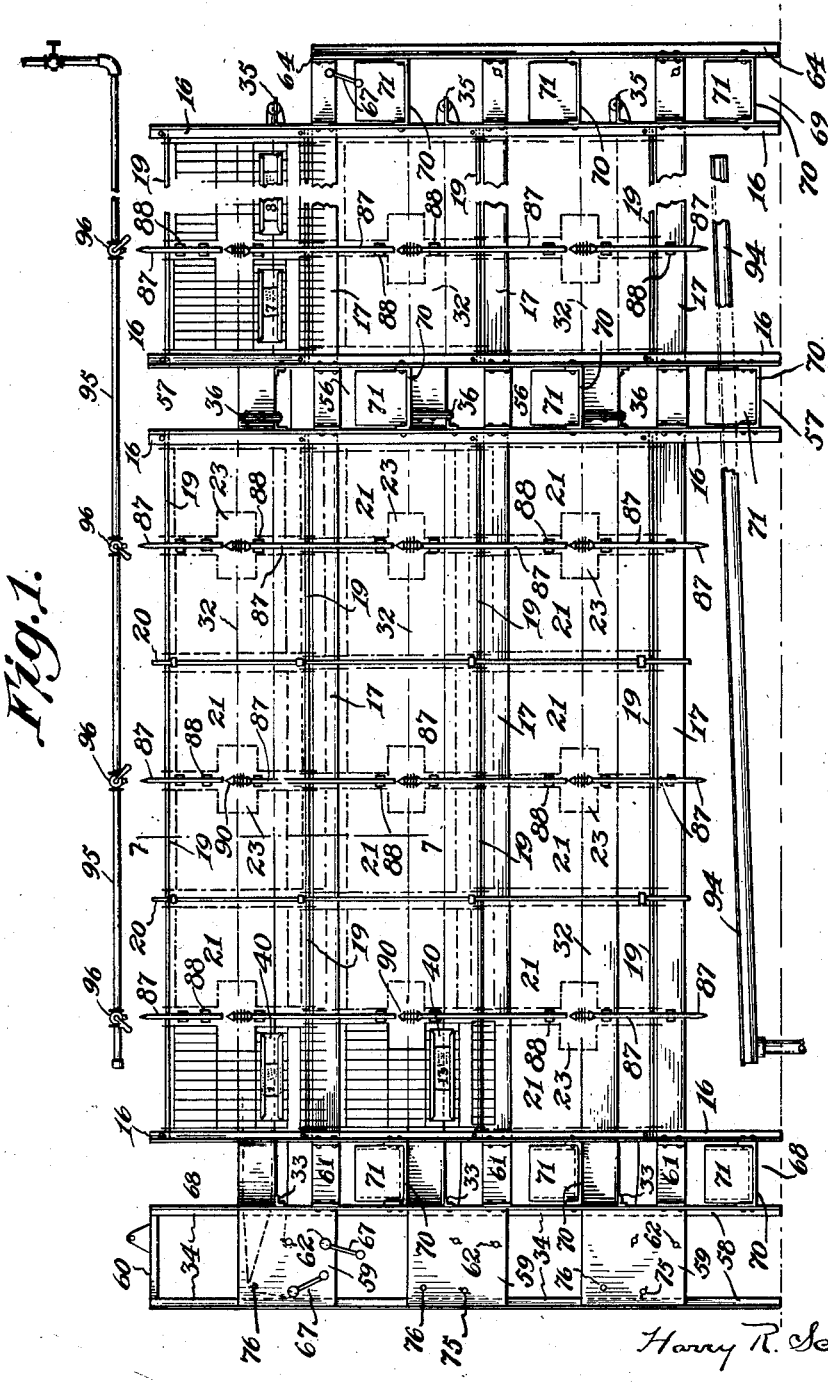

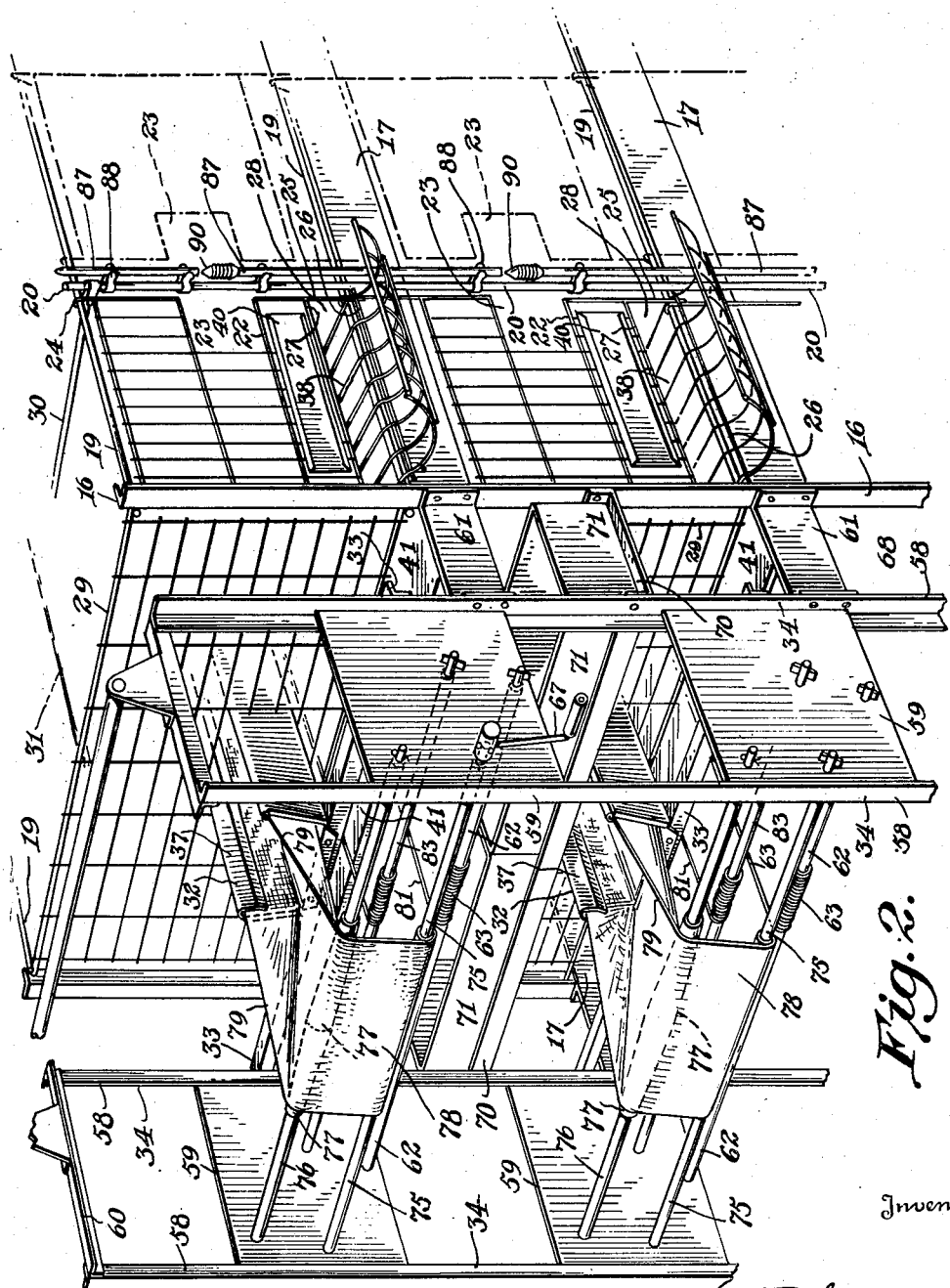

Inventor
Harry R. Schuppner
By Charles B. Mann Jr.
Attorney

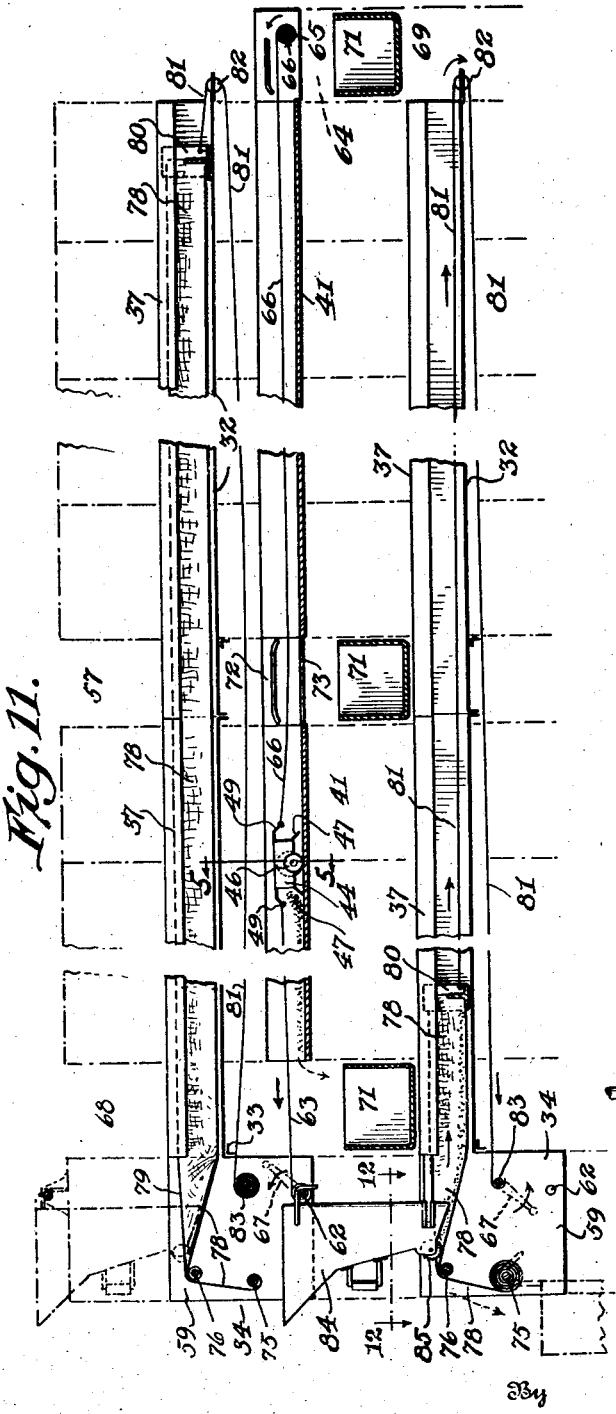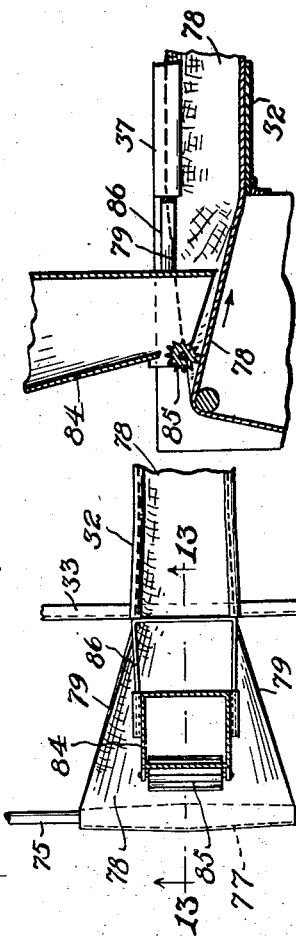

Patented Apr. 16, 1940

2,197,160

UNITED STATES PATENT OFFICE 2,197,160

COMPARTMENT COOP

Harry R. Schuppner, Dundalk, Md.

Application October 12, 1933, Serial No. 693,291

18 Claims. (Cl. 119—48)

This invention relates to an improved arrangement of compartment coop-units for poultry or fowl wherein large numbers of the latter may be confined under sanitary conditions and feeding and watering the fowl, as well as the cleaning of the various compartments may be carried out with a minimum of time and labor.

The invention also includes an arrangement of coop-units so that the plant may be enlarged by the ready addition of units to those previously in use thereby enabling a person to start an egg business on a small scale and gradually enlarge the plant, by the addition of units, as the business justifies.

A further object of the invention is to provide a novel arrangement of means whereby liability of a bird in one compartment fouling the food, drinking-water or the compartment of another bird is reduced to a minimum.

With these, and other objects in view as will hereinafter more clearly appear, an embodiment of the invention is illustrated in the accompanying drawings, wherein—

Fig. 1 shows in front elevation a plurality of the improved coop-units assembled.

Fig. 2 illustrates, in perspective, a portion of one end of a coop-unit with the improved feed-belt unit attached thereto,—the top of the coop-unit being omitted.

Fig. 3 shows, also in perspective, the opposite end of the coop-unit with the bottom beneath the top row of compartments for catching the droppings of the birds therein and also shows the forward edge of the scraper for cleaning the bottom with the means for actuating it and the pans at the end of the unit into which the droppings are deposited by the scraper.

Fig. 4 illustrates the scraper in perspective.

Fig. 5 shows a vertical sectional detail through the bottom and the scraper with the cylindrical deodorant distributor, the section being taken on the line 5—5 in Figure 11.

Fig. 6 illustrates the scraper and the deodorant cylinder held in an elevated position to prevent rotation of the cylinder as the scraper passes over the gap between adjacent coop-units.

Fig. 11 shows diagrammatically the arrangement of feed-distributor belts; scraper and the pulleys and line connections for operating the same.

Fig. 12 illustrates a sectional plan looking down on top of the feed-end of one of the feed-supply belts, as viewed on the line 12—12 of Fig. 11.

Fig. 13 shows a vertical sectional detail through the same parts as viewed on the line 13—13 of Fig. 12.

Figure 7:
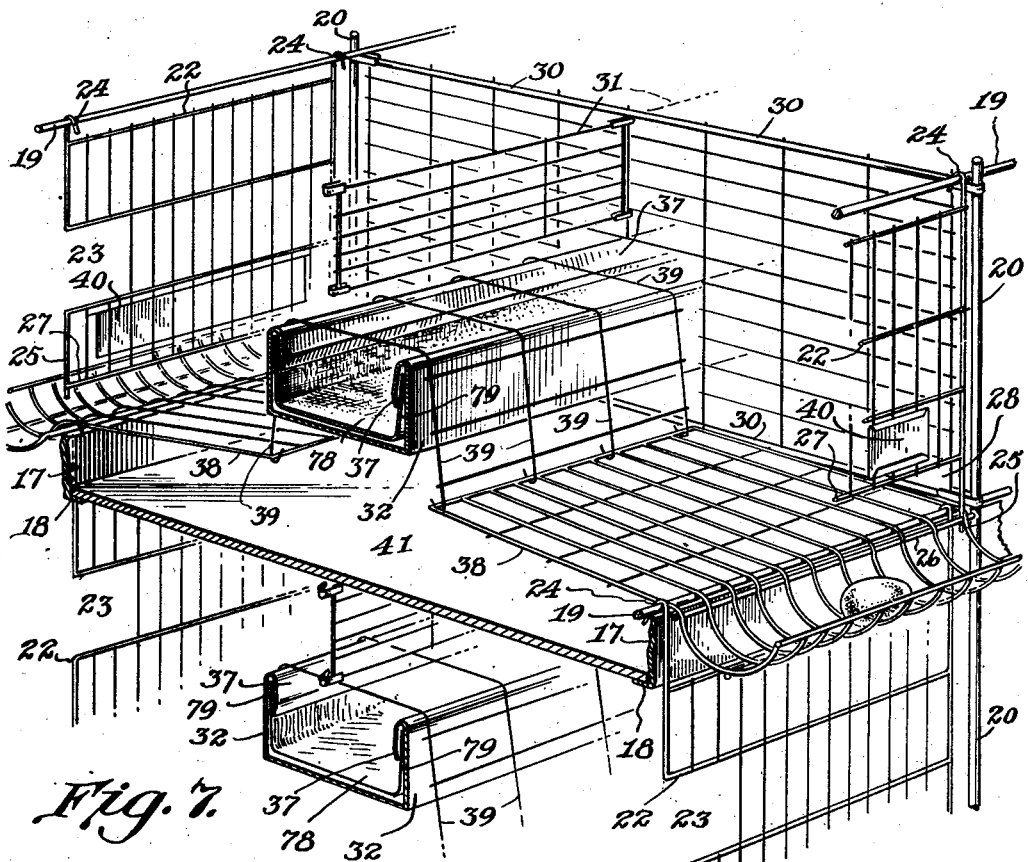
Fig. 7 shows a sectional perspective view through upper and lower coop-unit compartments and feed belt troughs taken on the line 7—7 in Figure 11.

Referring to the drawings, and particularly Figs. 1, 2 and 3 thereof, it will be noted that each coop-unit has a vertical angle-iron 16, at each of its corners.

Horizontal plates 17 extend from one corner angle to the other corner angle 16 at the same side of the unit and similar plates, in the same horizontal plane, connect the two corner angles at the opposite side of the unit.

These plates 17 are usually spot welded to the corner angles so as to make a permanent connection.

In the present instance there are three horizontal plates 17 at each of the opposite sides of the unit and each of the plates is in a different horizontal plane between the upper and lower ends of the corner angles,—the vertical spaces between the plates being substantially equal, as those spaces determine the height of horizontal rows of coop-compartments, as will presently be more fully explained.

Each horizontal side plate 17 has an inturned flange 18 along its bottom edge, as may be seen in Figs. 3, 5, 7 and 8, which inturned flanges are utilized for a purpose that will presently be explained.

In addition to the horizontal plates 17 between the corner angles 16, at the same side of the unit, there are also horizontal tie rods 19 which connect and are permanently secured to the said corner angles 16.

In the present instance, as shown in Fig. 1, four horizontal tie-rods 19 are employed to connect the two corner angles 16 at the same side of the unit.

It is to be understood that the two corner angles 16 at the same side of the unit with the horizontal plates 17 and the tie-rods 19 together form a rectangular frame, and to this frame are attached grids, stay rods and water-feeding devices (to be described) which together produce one complete side wall of a unit.

By referring to Figs. 1, 2, 3 and 7, it will be noted that a series of stay-rods 20 extend vertically from the lowermost horizontal plate 17 to the uppermost horizontal tie-rod 19 and these stay-rods are preferably welded to those plates 17 and rods 19 where they cross them, so as to stiffen the frame and at the same time provide a support for certain partition grids that divide the entire unit into compartments, as will also presently be explained.

In the present instance, five stay-rods 20 are arranged vertically along the frame at uniform distances from one corner angle 16 to the other corner angle so as to divide that distance into three horizontal rows of six substantially equal spaces 21, in each row, as noted on Fig. 1.

Each space 21 is covered at the side wall by a detachable grid 22 which serves as a closure for the compartment it controls, and as these closure-grids are believed to be novel, one of them, say that one in Fig. 3, will be described more or less in detail, to make clear their construction and operation.

By therefore referring to Fig. 3, it will be noted that the closure-grid 22 comprises a frame of horizontal and vertical wires that are welded together in such manner as to leave a space 23 through which the confined bird, such as a chicken, may extend its neck and head to get access to the drinking device, hereinafter to be explained.

This closure-frame has hooks 24 at its upper edge which hook over the horizontal tie rod 19 directly above them so that the entire closure-grid may hang pendantly from those rods. At their lower ends, these closure-grids have depending prongs 25 which extend downwardly at the rear of a cross-rod 26 in a floor grid which holds the closure-frame from swinging outwardly at its lower pendant portion.

The lowermost horizontal cross-bar 27 of each closure-frame is held elevated above the floor-grid so as to provide a space 28 through which eggs may roll, as will presently be explained.

It will be understood that an attendant may readily remove any one of the closure-frames by simply lifting it to disengage its hooks 24 from the tie-rod 19 and lifting its prongs 25 from behind the cross-rod 26 of the floor-grid beneath it.

The description hereinbefore given, has been directed to one side wall structure of the coop-unit and to avoid repetition, it should be understood that the opposite side wall of the same unit has precisely the same construction including the same kind of closure-frames.

The two side walls with vertical corner-angles 16 at each end thereof are set upright and are connected by end grids 29, such as shown in Figs. 2 and 3.

Other connections are also provided at the ends of the two side wall frames, as will presently be explained.

When the two side walls of the unit are set up, the vertical stay-rods 20 of one wall will be directly opposite and in the same vertical plane as like stay-rods of the opposite side wall, as shown best in Fig. 7, and at these points I provide vertical partition-grids 30 which extend across the unit from one side wall to the opposite side wall so as to divide the interior of the unit into a series of compartments.

In the present disclosure, each unit will have as many compartments as there are closure-frames in the two side walls, half of which will be accessible through the closures in one side wall and the others through the closures in the other side wall.

As there are eighteen closures in each side wall, there will therefore be thirty-six compartments in each unit.

By again referring to Fig. 7, it will be noted that a central dividing grid 31 is provided midway between the opposite side walls so as to divide the space between opposite closures into two compartments,—these dividing grids being hung or sustained from the vertical crosswise partition-grids 30.

The dividing grids 31 therefore extend in a direction parallel with the opposite side walls but are shorter in a vertical direction than the partition-grids 30 because they are located over a central feed-trough 32 which extends horizontally through the unit from one end to the other.

As there are three tiers of compartments, in each of the units, in the present instance, there will also be three feed-troughs 32.

These feed-troughs 32 are supported (see Fig. 2) by angle-bars 33 on an operating frame 34, presently to be explained, and at the extreme opposite end, see Fig. 3, by a horizontal angle-bracket plate 35.

In case several units are coupled together, as indicated in Fig. 1, the adjacent ends of the troughs are flanged at 36 and coupled together and the angle bracket-plates 35 are located at the last unit.

In practice I find no difficulty whatever in coupling together four or more units and extending the feed troughs throughout the several units to the angle-bracket plate 35 on the rearmost unit.

The troughs have the form of a channel with inwardly and down-turned flanges 37 at opposite sides of said channel.

The troughs extend horizontally through the unit or series of connected units from one end to the other and therefore cross the inner ends of the series of compartments that are formed in each unit between the side walls, the vertical partition grids 30 and the central dividing grids 31, as shown in Fig. 7.

By this arrangement of troughs and compartments, all of the birds confined in individual compartments in the same horizontal plane of a unit, or series of connected units, may have access to the same trough which extends through the unit or units in that horizontal plane, and all of those birds may be fed from that one trough.

By again referring to Fig. 7, it will be noted that each compartment is provided with a floor-grid 38 whose inner end is held by wires 39 that extend over the trough and whose outer end extends through the space 28 beneath the lowermost cross-bar 27 on the closure-frame, and said outer end of each floor-grid is bent into a trough-shape.

The floor-grids are sustained in a slightly inclined position, with the inner ends higher, so that eggs laid by the bird in the compartment may roll down the floor-grid and be deposited in the trough-shaped lower end as shown in Fig. 7.

In this way, eggs laid by a bird in one compartment will be caught in the trough-shaped lower end of the floor-grid of that compartment and thus be kept separate from eggs laid by birds in compartments at either side of it.

In practice, I prefer to provide a card-holder 40 on each closure-grid 22 so that a card may be slipped into each holder and a record kept thereon respecting the bird confined in that compartment; the eggs laid and their weight.

Beneath the floor-grids 38 in each horizontal tier of compartments, I provide a flat horizontal floor-bottom 41 throughout the unit from one end to the other. These floor-bottoms 41 are supported on the inturned flanges 18 of the horizontal side plates 17, as best shown in Figs. 3 and 7, and therefore extend all the way across each unit from one side wall to the opposite side wall. These floor-bottoms serve to catch all the droppings from the floor-grids of the compartments immediately above, and I provide means for readily cleaning these bottoms as will now be explained.

By now referring to Figs. 4, 5, 6 and 11, it will be noted that I employ a scraper and a distributor for pulverulent or granular material, both of which are designed to travel along the floor-bottom 41 to scrape the droppings therefrom and at the same time distribute a suitable absorbent or deodorant material over the scraped surface.

This scraper device comprises a frame having a substantially rectangular chamber 42 with vertical cross-walls 43 and opposite side walls 44. The length of the cross-walls 43 is such as to extend substantially all the way across the floor-bottom between the opposite side plates 17.

Each side wall 44 of this scraper has a trunnion 45 on which there is a loose roller 46 of such diameter as to keep the lower edge of the scraper slightly elevated above the top surface of the floor-bottom. These rollers at the two opposite sides of the scraper are located midway between the front and rear of the scraper, so the latter may rock on them and be tilted downwardly at either the front or rear, as will presently be explained.

The lower edges of the scraper's cross-walls 43 are inclined as at 47,—one edge being inclined in, what might be termed a forward direction, while the other is inclined in a rearwardly or reverse direction. Both of these inclined edges are located directly over the floor-bottom so that if the scraper is drawn in one direction over that bottom, the scraper will be tilted on its trunnions to move one inclined edge 47 downwardly into engagement with the bottom surface so as to scrape that surface as it is drawn along,—while obviously, the other edge 47, will be slightly elevated from said floor-bottom and thus be held out of scraping contact.

At the top, the scraper has fore and aft horizontal flanges or baffles 48, each with a downwardly-inclined edge 49, which baffles prevent the scrapings from riding up and over the top of the scraper.

At the opposite ends, each horizontal top flange 48 is provided with a laterally extending lifter lug 50, which lugs are provided for a purpose that will presently be explained.

In the rectangular chamber 42 of the scraper, I provide a perforated cylinder 51 with a knurled roller 52 at each end thereof. These rollers have central pins 53 extending therefrom which loosely rest in bearing-blocks 54 at the inner sides of the side walls 44, and normally the knurled rollers 52 seat on the floor-bottom 41, as shown in Fig. 5, and as the scraper is drawn over said bottom the rollers will turn, thereby rotating the perforated cylinder 51.

The bearing notches in the blocks 54 are merely notches which are open at the upper side so that the cylinder 51 and its rollers 52 may readily be lifted out of the scraper.

Each knurled roller 52 has a cylindrical central plug 55 at one side which snugly enter the end of the perforated cylinder and when the cylinder and rollers are lifted out of the scraper, one or both of the rollers may readily be pulled away from the cylinder so as to permit access to the interior of the cylinder.

In this way the cylinder may be loaded with powdered or granulated material 56 which latter may be distributed over the floor-bottom 41 as the scraper is moved over the latter in either direction.

It will be understood that the coop structure may be used with one unit alone, or with a series of coop-units coupled together. In Figs. 1 and 11, I have shown the device as employing a series of coupled-together units.

When a series of units are coupled together, I preferably provide gaps or spaces 57 between adjacent units, because I have found in practice that the floor-bottoms beneath the various horizontal rows of compartments may be more readily cleaned by providing access to opposite ends of each unit,—it being understood that in the present illustration, each unit contains thirty-six compartments and that there will be one bird or hen in each compartment.

When a plurality of units are coupled together, all the compartments in a horizontal row in one unit will be in the same horizontal plane with a similar row of compartments in the next unit and this also means that the feed trough of one unit will register with and be in the same plane with the feed trough in the next unit. Also the floor-bottom of one unit will be in the same horizontal plane as the floor-bottom in the next unit, but adjacent floor-bottoms will be separated from each other by the spaces 56 between units.

Although the horizontal floor-bottom, in a given horizontal plane, of one unit, is vertically spaced from the floor-bottom in the same horizontal plane of the next unit, I nevertheless utilize but one floor-bottom scraper for the bottoms of all the connected units which bottoms are in the same horizontal plane, as will now be explained, reference being made to Figs. 1, 2, 3, and 11.

For the purpose of clearness in explanation, I will term the left hand end of the unit, or series of units, as viewed in Figs. 1, 2 and 11, the forward ends, while the right hand ends of the same units will be termed the rear ends.

In front of the forward end of the unit, but spaced vertically therefrom, I provide what may be termed an operating frame 34. This frame has corner posts 58 which are connected by side plates 59, and angle bars 60. The angle-bars 33 which sustain the forward ends of the feed troughs 32, also extend crosswise of and connect two or the corner-posts 58.

The operating frame 34, while vertically spaced from the forward end of the first unit, is connected thereto by tie-plates 61.

This operating frame sustains a horizontal shaft 62 on which there is wound a wire or cord 63 which extends over the floor-bottom 41 and has its end attached to the forward inclined edge 49 of the scraper, as shown diagrammatically in Fig. 11.

At the rear end of the units, see Figs. 1 and 3, I provide another vertical frame 64 which carries a horizontal shaft 65 and on this latter shaft there is wound a wire or cord 66 which extends forwardly over the floor-bottom 41 and is attached to the rear inclined edge 49 of the scraper.

A detachable crank 67, or any other means, is utilized to turn the shaft 62 or 65 to wind the wire 63 or 66 thereon, but obviously, when one shaft is turned to wind the wire or cord thereon, the wire or cord on the other of said shafts will unwind as the scraper is moved over the floor-bottom.

Thus it will be understood that if shaft 62 at the forward end of the unit or series of units is turned so as to wind the wire or cord 63 thereon, the scraper will be drawn toward said forward end, as indicated in Fig. 11, while the wire or cord 66 will unwind from shaft 65 at the rear end of the unit or units.

Attention is directed to the fact that when either of the wires 63 or 66 is being wound on its shaft, that wire, which is being wound, is attached to the upper part of the scraper and will tilt the same so as to move its inclined flange 47 at the advancing side of the scraper down against the surface of the floor-bottom so it will scrape that surface as it advances and push the droppings ahead of it, also as indicated in Fig. 11.

I have found, in practice, where a series of units are connected together, that difficulty in cleaning will be experienced if the scraper must travel throughout the entire length of the series of units before the scraped droppings can be discharged and removed from the path of the advancing scraper. I have therefore provided means whereby at intervals, as the scraper advances, the scraped droppings may be discharged and the scraper continue its advance.

It has hereinbefore been pointed out that between adjacent units, I provide vertical spaces 57 to facilitate the cleaning of the floor-bottoms. In further carrying out this idea, I also provide vertical spaces 68 and 69,—the former being at the forward end of the first unit of a series and the latter space 69 being at the rear of the unit or the series of units, as shown in Figs. 1, 2 and 11.

At each of these spaces 57, 68 and 69, I provide horizontal shelves 70 which extend crosswise of the coop units from side to side, and on these shelves I place suitable removable receptacles 71.

These receptacles are open at the top and, as clearly shown in Fig. 11, these open tops are located in a horizontal plane slightly below the ends of the floor-bottoms. Therefore when the scraper reaches the end of one floor-bottom, the droppings scraped up by its advance will drop down into the open tops of the receptacles, while the scraper will continue its advance across the said space and onto the floor-bottom of the next unit.

Of course, while the scraper is being advanced, it is sustained by the end rollers which roll along the floor-bottoms but the inclined flange 47 on the advancing side of the scraper will be tilted down into contact with the surface of said bottom.

When one of the spaces 57 is reached by the scraper where the droppings are deposited in a receptacle 71, coupling-plates 72 extend across the spaces 57 to connect one unit with the next and these coupling-plates have inturned flanges 73 which are flush with the floor-bottoms 41 of the units at each side of it, which flanges 73 serve as supports for the scraper rollers 46 as the scraper passes over from one bottom to the next.

It has hereinbefore been stated that the cylinder 51 carried by the scraper, will be revolved during the travel of the scraper so as to deposit powdered material over the floor surface immediately after the latter has been scraped. This is effected by the weight of the cylinder 51 on the knurled rollers 52, and the peripheries of these rollers project through the open bottom of the scraper frame and travel over the floor-bottom as the scraper advances.

When the scraper reaches one of the vertical spaces 57 however, it is desired to stop the rotation of the cylinder and the discharge of powder therefrom until it has passed over that space.

To effect this, I provide the inner sides of each of the coupling-plates 72 at the spaces 57, with an inturned flange-support 74 above the flanges 73.

Figure 8:
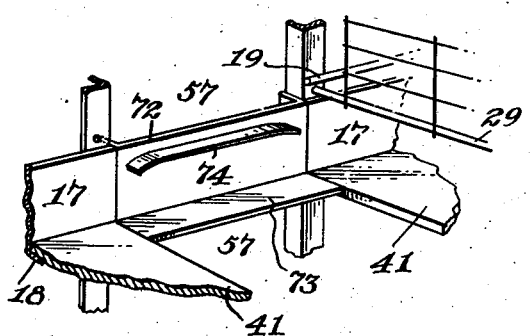
Fig. 8 illustrates a perspective detail of the scraper and cylinder elevating track over the gap between coop-units.

These flange-supports 74 lie in the path of the lifter lugs 50 on the advance side of the scraper, see particularly Figs. 5, 8 and 11, so that as the scraper advances, the lugs 50 thereof will ride up on the flange-supports 74 and the entire scraper with the cylinder 51 will be lifted as it passes over the space 57 and this lifting of the scraper and cylinder also raises the rollers 46 and 52 and stops the revolution of the latter roller as well as of the cylinder 51 so that no powder will be discharged from the cylinder as the same passes over the spaces 57 and the receptacles 71 therein.

I have pointed out herein that in the present disclosure, there are shown three tiers of compartments in each coop-unit and that there are also three feed troughs 32, each of which extends horizontally throughout the several units. These feed-troughs are also arranged between the two horizontal rows of compartments so as to be accessible by all of the birds or hens in that horizontal row throughout the unit or the series of connected units.

Means must therefore be provided for distributing the feed through the trough so it will be accessible to all of the birds, and further, that the character of the feed may be changed or unused feed removed before it spoils.

I supply the feed throughout the length of the trough by means of a belt, which latter is so arranged that the trough merely serves as a guide for the belt and to prevent the feed from getting between the trough and belt and becoming sour or fouled and unfit for use.

By means of my belt arrangement, I am also able to readily change the character of the feed at any time and to ensure that the remains of the last feed may be removed before supplying fresh or a change of such feed, so that a scientific and systematic feeding may be followed that will be productive of the greatest quantity and quality of eggs.

By now referring to Figs. 1, 2, 7, and 12, the feed-belt mechanism and troughs will be explained.

The operating frame 34 carries a horizontal shaft 75 and above that shaft it carries another shaft 76. This latter shaft carries a reversely tapered pulley 77, which is of the greatest diameter midway between its ends and tapers from said midway point to its opposite ends where it is smallest in diameter.

A flexible belt 78, in this instance, is wound upon shaft 75 and passes around the reversely-tapered pulley 77 after which the opposite longitudinal edges 79 of the belt are turned up and fed beneath the down-turned flanges 37 on the guide-trough 32. The belt 78 therefore assumes a channel shape, corresponding to the shape of the trough, and its up-turned edges are confined beneath the down-turned trough-flanges 37, as clearly shown in Fig. 7 so that the feed will be confined in the trough-shape belt and the edges of the belt will be protected to prevent the birds from dropping feed between the belt and the trough.

One end of the belt 78 is attached to a U-shaped plate 80 whose up-turned ends project under the trough-flanges 37. A wire or cord 81 has one end attached to the plate 80 and this wire extends through the trough 32 to the rear end of the unit or the series of units where it passes around a pulley 82.

After passing around pulley 82 the wire 81, in the present instance, then returns beneath the trough 32 to the operating frame 34 where it is wound on a horizontal shaft 83.

It will thus be understood that by placing a crank on the end of shaft 83, or by turning that shaft by any suitable means, the wire 81 will be drawn through the trough 32, from left to right, thereby drawing the feed-belt 78 through said trough with feed thereon and past all the compartments at opposite sides of the feed belt.

To facilitate the placing of feed on the belt and at the same time aid in turning the opposite longitudinal edges 79 of the belt up so as to direct those edges under the down-turned flanges 37 of the trough, I provide a feed hopper 84 with a tapered lower open end. This lower end of the hopper carries a roller 85 which is of less length than the width of the belt and presses down on the latter directly in front of the reversely-tapered pulley 77 and by thus depressing the belt in the center as it leaves the pulley, aids in turning the opposite side edges of the belt upwardly as they pass to the end of the trough where they are directed under the down-turned flanges 37.

A loop-bar 86 attached to the lower end of the hopper extends toward and engages the end of the trough to steady the lower hopper-end.

When it is desired to distribute feed through the trough 32 where it will be accessible to all of the birds or hens confined in the horizontal rows of compartments at each side of the trough, the shaft 75 will be turned so as to wind the feed-belt 78 thereon. While this is being done, the wire or cord 81 will unwind from shaft 83 because U-shaped plate 80 which is attached to the end of the belt will move back through the trough 32 toward the operating frame 34.

The feed hopper 84 is then hung over the belt with its lower end immediately in front of the reversely tapered pulley 77 and the feed fed from this hopper onto the upper side of the belt. Shaft 83 will now be turned and wire or cord 81 wound thereon. As this wire or cord 81 is wound on the shaft 83, it will draw the plate 80 and the end of the belt 78 through the trough, thus conveying the feed on top of the belt back through the trough to the rear end of the latter, whether that be at the end of one, two, three or more coop-units.

It has hereinbefore been pointed out that each compartment 21 in the coop-units has a detachable closure-grid 22 at one or the other side wall and that each of said closure-grids comprises a frame of horizontal and vertical wires so welded together as to leave a space 23 at one side of the gride-frame through which space the confined bird may extend its head and neck to get access to the drinking device.

By reference to Figs. 1 and 3, it will be noted that these spaces 23 in the closure-grid frames of two adjoining compartments are arranged in adjacent vertical side edges of the grid-frames for those compartments so that a drinking-water supply unit may extend vertically from the top to the bottom of the coop-unit and serve to supply water for the birds confined in six compartments of the said coop-unit.

It is important in the care of chickens, that the drinking water be kept fresh and free of contamination and that it be supplied to the birds in a way that will protect the water against contamination by the birds themselves.

With these desirable features in mind, I provide a plurality of vertical rods 87 which are supported, in the present instance, by clip-plates 88 from the vertical stay-rods 20 at the sides of the coop-unit. These vertical rods 87 are preferably arranged in sections each of which extends down to and terminates at a space 23 in the closure-grids.

Each of these rod-sections 87 carries a water-retaining head 89 which latter has a cone-shaped upper end 90 and a cone-shaped lower end 91. Between the two cone-shaped ends 90 and 91 the body of the head has an alternate series of annular channels 92 and annular flanges 93.

These heads 89 are attached, in the present instance, to the ends of the rod-sections 87 so that water trickling down the outer circumference of the rod will be received by the upper cone-shaped end 90. The water will then trickle down from the cone-end 90 and accumulate in the annular channels 92 after which it will drip from the lower cone-shaped end 91 to the rod beneath.

As the heads 89 are carried on the rods 87 so they will be in alinement with the openings or spaces 23 in the closure-grids, the birds confined in the compartments may reach out through those spaces 23 and drink water from the annular channels of the heads adjacent to the compartment in which they are confined.

It is to be noted that the rods 87 are solid and the water merely trickles down the outer sides thereof and no internal passages are employed in the rods in which food from the bill of a bird can get into the water and clog or cut off or contaminate the water-supply.

In practice, the annular channels 92 create little reservoirs of water into which the bills of the birds can be readily inserted and any particle of food deposited in the water from the bird's bill will simply wash down.

Below the lowermost rod 87 in each row I arrange a trough 94 (see Fig. 1) into which the water may drip and be conveyed off.

Water is supplied to the upper ends of the uppermost rod in each vertical series, from a pipe 95 and valves 96 in that pipe, directly over the said upper rod-ends, direct the water drop-by-drop onto said rods, so that very little water is required.

By clipping the rods 87 in place, they may readily be detached, thoroughly cleaned and replaced.

I have found in practice that when the rods 87 are dry, that is, before water in drops has been supplied thereto, or have become dry during the night, when water has been turned off, there is a tendency, when water drop-by-drop is supplied to such dry rods, for that water to take a spiral course when trickling down the rods. This spiral flow of water sometimes becomes so pronounced that the water will be thrown off centrifugally from the rods instead of flowing down vertically. In my experience this has occurred to such an extent that the walls and floors of the coop-units become disagreeably wet.

Figures 9, 10:
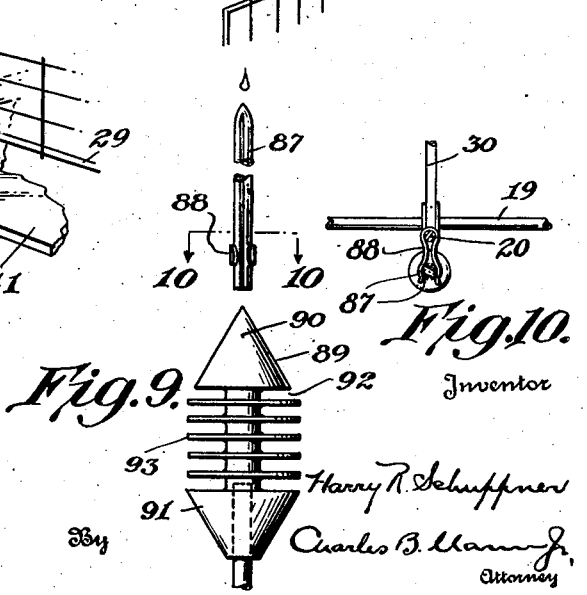
Fig. 9 shows a detail of one of the gaps in the water-supply rods.
Fig. 10 illustrates a sectional plan through the same,—the section being taken on the line 10—10 of Fig. 9.

To overcome this I provide each rod 87 with one or more vertical circumferential grooves or channels 97, as shown in Figs. 9 and 10, so that the water delivered to the outer circumference of the rods will be taken up by the vertical channels and conducted downwardly. This prevents the spiral flow of the water and overcomes the disagreeable dampness above referred to.

In the present instance I employ four vertical channels or grooves 97 in each rod, but the number of such grooves is not material to the invention.

Having described my invention, I claim—

1. An elongated compartment coop-unit having two side and two end walls, partitions dividing the unit into two longitudinal rows of coop compartments which are side by side in a horizontal plane between the end walls of the unit, a trough extending longitudinally through the unit from one end to the other between the two longitudinal rows of compartments said trough having inside down-turned flanges along its upper edges and a movable belt in said trough with its edges turned up under said down-turned flanges.

2. A compartment coop-unit having two side walls and two end walls with two rows of coop-compartments in a horizontal plane between the end walls, a feed supply trough extending through the unit between the two rows of compartments, a floor-grid in each compartment, the inner ends of said grids being sustained from said trough, and a floor-bottom beneath the floor-grids and extending from end to end of the unit.

3. A compartment coop-unit having two side walls and two end walls with two longitudinal rows of coop compartments in a horizontal plane between the end walls of the unit, a trough extending through the unit between the two longitudinal rows of compartments, a flexible belt mounted at one end of the unit to be drawn through said trough, a plate having an upright transverse portion and shaped to fit and slide in said trough and to which plate the end of the belt is attached, and means attached to said shaped plate for drawing the same and the attached belt through the trough between the two longitudinal rows of coop-compartments.

4. A compartment coop having a series of coop-units slightly spaced at their adjacent ends one from another and each unit having two side walls and two end walls with horizontal rows of coop-compartments, one row being in a horizontal plane above another, floor-gratings for each horizontal row of compartments, floor-bottoms for each horizontal row of compartments, the floor-bottom of one unit being in horizontal alinement with a floor-bottom of the next unit, means at the spaces between units for connecting one floor-bottom with the next, receptacles at said spaces between the adjacent ends of floor-bottoms, scraper means movable over said space-means from one floor-bottom to the next and depositing the scrapings in the receptacles at said spaces, powder distributing means movable with the scraper, and means at said spaces to cut off the distribution of said powder.

5. A compartment coop-unit having side and end walls with separated coop-compartments in a plurality of horizontal planes between the end walls so the compartments will be arranged in tiers, a plurality of sets of rods, each set arranged in alignment vertically one rod above another, one of said rods having its lower end adjacent each of the compartments, heads carried on said rods, one adjacent to each compartment, each head being directly beneath one of said lower ends and having annular grooves to form reservoirs for water and means for supplying water to the uppermost rod of each set of rods so said water will trickle down the rods and accumulate in the annular grooves of said heads.

6. A compartment coop-unit having coop-compartments in tiers one above another, a plurality of rods in vertical alinement to pass the tiers of compartments, heads carried on said rods adjacent to each compartment in a vertical plane, each head having tapered upper and lower ends with a plurality of annular grooves between said tapered ends, and means for supplying water to said rods and heads so as to trickle down over said heads and accumulate in the grooves of said heads.

7. A compartment coop-unit having coop-compartments in tiers with one compartment above another, a plurality of rods in vertical alinement to pass the tiers of compartments, each rod having vertically-extending groove means to direct water down the rod, heads carried on said rods adjacent to each of the compartments in a vertical plane, each head having a plurality of annular grooves to receive and accumulate water, and means for supplying water to said heads and rods so it can trickle down over said heads and accumulate in said grooves.

8. A confining device for poultry comprising a series of individual coop compartments in a row, the compartments having floor-grids, a floor-bottom beneath said grids, a scraper having a scraping edge movable over the floor-bottom to scrape the droppings therefrom, a rotary distributor mounted on the scraper back of said edge in the direction of scraping and movable with the scraper for distributing a finely-divided substance over the floor-bottom behind the scraping edge, and means associated with the confining device for moving the scraper and distributor longitudinally of said series of compartments in the scraping operation.

9. A compartment coop-unit having two side and two end walls with two longitudinal rows of coop compartments in a horizontal plane between the end walls of the unit, a feed supply means extending longitudinally through the unit from one end to the other of the unit and between the two rows of compartments whereby to supply feed to birds confined in the two longitudinal rows of compartments from opposite sides of the said feed means, and a conveyor belt for distributing feed along said supply means to said compartments and means at one end of said unit for operating said belt to advance and retract the belt and means at the same end for supplying feed to the belt.

10. A compartment coop-unit having two side walls and two end walls with two longitudinal rows of coop compartments in a horizontal plane between the end walls of the unit, a feeding means extending longitudinally of the unit between the rows of compartments and accessible from the compartments in both rows, and means for preventing the birds occupying the coop from crossing the feeding means, a separate floor-grid in each compartment, a stationary floor-bottom beneath said floor-grids, said bottom extending under both longitudinal rows of compartments from one end wall to the other of said unit and a scraper and means for moving the same forwardly and backwardly on the stationary floor-bottom for cleaning the latter.

11. A compartment coop-unit having two side walls and two end walls with coop-compartments in horizontal and vertical planes between the end walls whereby the compartments will be arranged in tiers, a separate closure for each coop-compartment, each closure having an opening through which the bird may project its head,—the openings in adjoining compartment-closures being adjacent to each other, a plurality of rods in vertical alinement between the closure-openings in two vertical rows of compartments the lower end of one rod and the upper end of the next rod being in spaced relation at said closure-openings, means supported solely on said rods and at said openings to accumulate water trickling from one rod toward the other and means for supplying water to the uppermost of said vertical rods.

12. A compartment coop-unit having two side walls and two end walls with coop-compartments in a plurality of horizontal planes so as to be arranged in tiers with one row above another, a series of vertical rods extending from an upper compartment in a vertical row down and passing the compartments beneath, said rods having secured to their end portions adjacent the compartments they pass means for accumulating water that trickles down the exterior of said rods and means for supplying water to the upper end of said uppermost rod.

13. A compartment coop-unit having two side walls and two end walls with coop-compartments in a plurality of horizontal planes so as to be arranged in tiers with one row above another, a series of vertical rods extending from an upper compartment down and passing the compartments beneath, said rods carrying grooved and flanged heads at each compartment for accumulating water that trickles down said rods and means for supplying water to the upper end of said uppermost of said vertical rods.

14. A compartment coop having a series of coop-units slightly spaced at their adjacent ends one from another and each unit having two side walls and two end walls with horizontal rows of coop-compartments, one row being in a horizontal plane above another, floor gratings for each horizontal row of said compartments, stationary floor-bottoms for each horizontal row of compartments, the floor-bottom of one unit being in horizontal alinement with the floor-bottom of the next unit and spaced therefrom, means at the spaces between units for bridging the space between the floor-bottom of one unit and the floor-bottom of the next unit, scraper means on one floor-bottom and movable over the bridging means at the spaces to pass to the bottom of the next unit and means for moving said scraping means to drop the material scraped through said spaces and a receptacle at each space to receive the material dropped.

15. A compartment coop having a series of coop-units spaced at their adjacent ends and each unit having two side walls and two end walls with central dividing grids to separate the inner ends of adjacent compartments, said dividing grids being of less length vertically than the said compartments and forming two rows of coop-compartments in a horizontal plane between the end walls of each unit and a central feed-supply belt extending under the central dividing grids through each unit between and accessible to the birds in the two rows of compartments, said feed supply belt extending across the space from one unit to the next, and means at the opposite ends of the series of units for moving the feed-belt in either direction through said units.

16. A compartment coop having a series of compartments in a horizontal row, said compartments having floor-grid bottoms, a floor bottom extending longitudinally beneath said grids and spaced downwardly therefrom, a scraper having a scraping edge for the floor bottom with means for moving the scraper backwardly and forwardly along the bottom, a support on which the scraper is rocked in the direction of motion bringing the scraping edge into contact with the floor bottom as the scraper advances in one direction and raising it therefrom as it moves in the opposite direction, and means connected to the scraper to move therewith and adapted to distribute powdered material on the floor bottom, said distributing means being in the rear of the scraping blade as the latter advances in contact with the floor bottom.

17. A compartment coop unit comprising a plurality of rows of compartments side by side, longitudinal walls forming the side walls of said compartments, transverse walls separating the compartments in each row, a feed trough between the rows and extending the length of the unit, a barrier for preventing the occupants of the coop from crossing the trough, the coop having a bottom adapted to catch the waste and accessible for cleaning, and a grid floor spaced above the bottom, said grid floor being inclined downwardly toward the side of the coop unit and each compartment having an opening just above the floor to discharge eggs and a receptacle to receive the eggs from the opening.

18. A compartment coop-unit having side walls and end walls with a series of individual coop-compartments in horizontal planes between the end walls, a separate closure for each individual coop-compartment, each closure having an opening through which the bird may project its head, vertical rods arranged in sets of rods located one above the other and placed end to end on the exterior of the unit adjacent said closure-openings, means supported on the upper ends of said vertical rods adjacent to said closure-openings for accumulating water adjacent said openings and means for supplying water to the upper end of the uppermost rod of each set of said rods.

HARRY R. SCHUPPNER.

Patent No. 2,197,160 Granted April 16, 1940
HARRY R. SCHUPPNER

The above entitled patent was extended November 27, 1951, under the provisions of the act of June 30, 1950, for 7 years and 173 days from the expiration of the original term thereof.

*Commissioner of Patents.*